(12) United States Patent
Hasegawa et al.

(10) Patent No.: US 8,086,033 B2
(45) Date of Patent: Dec. 27, 2011

(54) DEVICE, METHOD, AND PROGRAM STORAGE MEDIUM FOR COLOR CONVERSION, DEVICE, METHOD, AND PROGRAM STORAGE MEDIUM FOR COLOR CONVERSION COEFFICIENT GENERATION

(75) Inventors: Noriko Hasegawa, Kanagawa (JP); Yasunari Kishimoto, Kanagawa (JP); Yasuki Yamauchi, Kanagawa (JP); Hidetoshi Kawashima, Kanagawa (JP); Kiyoshi Une, Saitama (JP); Akihiro Ito, Kanagawa (JP); Ryosuke Higashikata, Kanagawa (JP); Yousuke Tashiro, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1023 days.

(21) Appl. No.: 11/971,665

(22) Filed: Jan. 9, 2008

(65) Prior Publication Data

US 2008/0170779 A1    Jul. 17, 2008

(30) Foreign Application Priority Data

Jan. 15, 2007   (JP) .............................. 2007-005721

(51) Int. Cl.
    *G06K 9/00*    (2006.01)
(52) U.S. Cl. ........................................ 382/167; 358/523
(58) Field of Classification Search .................. 382/167; 358/518, 523
    See application file for complete search history.

(56) References Cited

U.S. PATENT DOCUMENTS

| 5,552,904 A * | 9/1996 | Ryoo et al. ................ 358/518 |
| 2005/0024652 A1 | 2/2005 | Gondek |
| 2005/0219574 A1 | 10/2005 | Ok et al. |
| 2006/0012840 A1 * | 1/2006 | Fukuda ..................... 358/518 |

FOREIGN PATENT DOCUMENTS

| CN | 1620150 A | 5/2005 |
| JP | A 2002-152538 | 5/2002 |
| JP | A 2005-057767 | 3/2005 |
| JP | A-2005-159880 | 6/2005 |
| JP | A 2005-184601 | 7/2005 |
| JP | A 2005-184602 | 7/2005 |
| JP | A 2005-191808 | 7/2005 |
| JP | A-2005-269540 | 9/2005 |
| JP | A-2006-254369 | 9/2006 |

OTHER PUBLICATIONS

Office Action dated Jun. 11, 2010 in Chinese Patent Application No. 200810003412.5 (with translation).
Office Action issued on May 24, 2011 in corresponding Application No. 2007-005721. (with English language translation).

* cited by examiner

*Primary Examiner* — Jon Chang
(74) *Attorney, Agent, or Firm* — Oliff & Berridge, PLC

(57) ABSTRACT

A color conversion device is provided including: a setting unit that sets a conversion mode, based on characteristics of a source color region related to an input image signal in a color space, for converting the input image signal to an image signal that falls within at least one color region from a plurality of color regions that have been defined in the color space; and a conversion unit that converts the input image signal in accordance with the conversion mode into the image signal that falls within the color region.

13 Claims, 3 Drawing Sheets

US 8,086,033 B2

DEVICE, METHOD, AND PROGRAM STORAGE MEDIUM FOR COLOR CONVERSION, DEVICE, METHOD, AND PROGRAM STORAGE MEDIUM FOR COLOR CONVERSION COEFFICIENT GENERATION

CROSS-REFERENCE TO RELATED APPLICATION

This application is based on and claims priority under 35 USC 119 from Japanese Patent Application No. 2007-005721 filed Jan. 15, 2007.

BACKGROUND

1. Technical Field

The present invention relates to a color conversion device, color conversion method, color conversion program storage medium, color conversion coefficient generation device color conversion coefficient generation method and color conversion coefficient generation program storage medium. The present invention more specifically relates to color conversion process and color conversion coefficient generation process that carry out color conversion on color image signals when reproducible color regions for color image signals on the input device and those of the output device are different with each other.

2. Related Art

Devices for outputting color images exist, such as, for example, CRT and LCD display devices, printing devices such as printers, and the like. Output devices such as these, differ in their reproducible color ranges due to factors such as their different output methods, in other words they differ in their color regions. Therefore, for example, when printing an image that has been generated on a CRT with a printer, if the same data is output to different output devices, it is possible that colors which are unable to be reproduced may exist. In such cases; at least the colors that are unable to be reproduced are replaced with colors that are thought to be the closest thereto for output, so that the image as a whole may be reproduced with optimal image quality for that output device. In order to carry out the above, it is necessary to carry out color mapping that replaces the received color image signal with colors that fall within the color region of the output device, or, in other words, it is necessary to carry out color conversion.

However, there are various characteristics of input image signals, and with the above described conventional technology, it is not always the case that appropriate color conversion can be carried out for a given input image signal.

SUMMARY

A first aspect of the present invention is a color conversion device including; a setting unit that sets a conversion mode, based on characteristics of a source (input end) color region related to an input image signal in a color space, for converting the input image signal to an image signal that falls within at least one color region from a plurality of color regions that have been defined in the color space; and a conversion unit that converts the input image signal in accordance with the conversion mode into the image signal that falls within the color region.

BRIEF DESCRIPTION OF THE DRAWINGS

An exemplary embodiment of the present invention will be described in detail based on the following figures, wherein.

DETAILED DESCRIPTION

An exemplary embodiment of the present invention will now be explained, with reference to the drawings.

Figure 1:
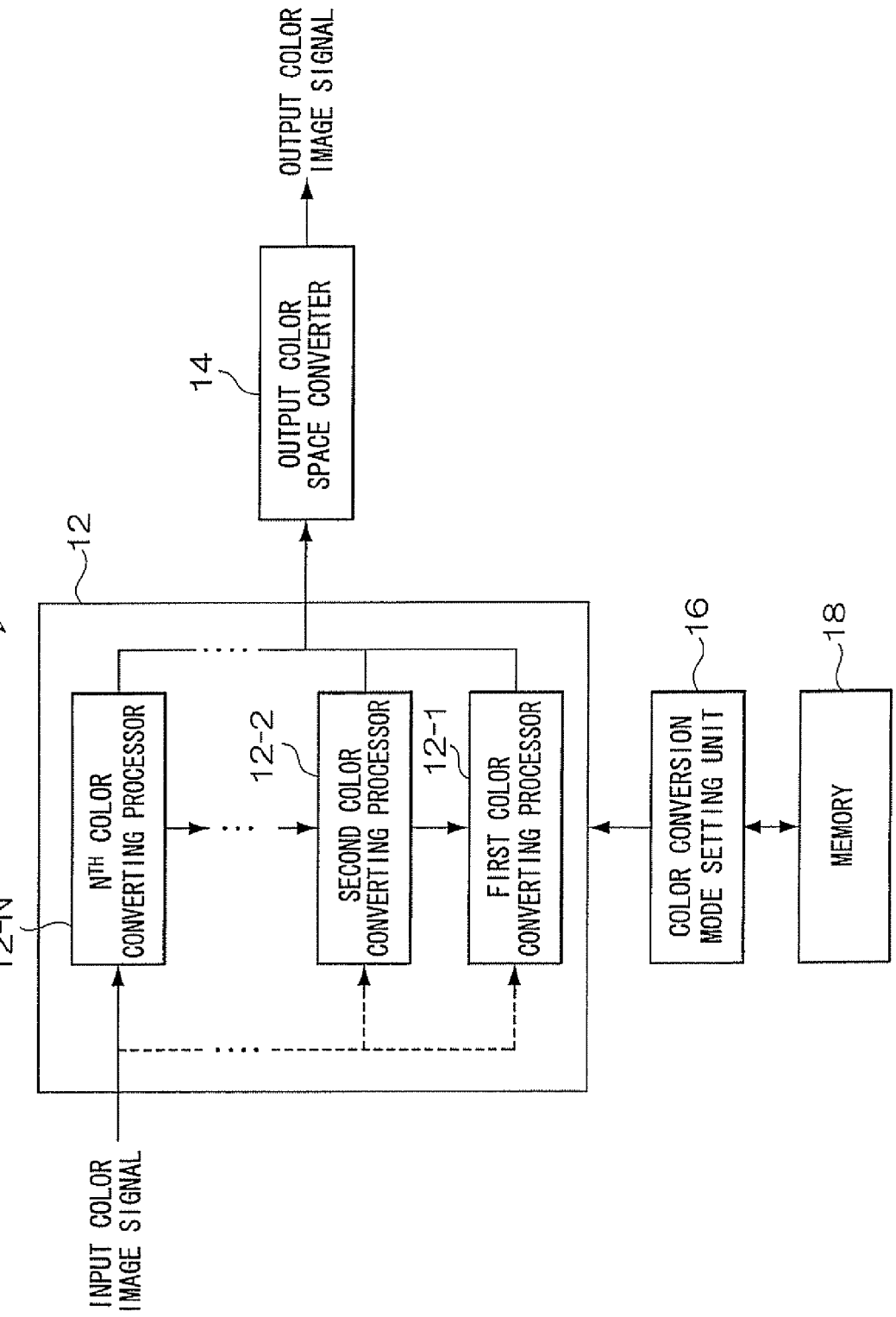
FIG. 1 is an outline block diagram of a color conversion device.

Explanation will first be given of an outline configuration of a color conversion device. FIG. 1 is a block diagram of an example outline configuration of a color conversion device 10. The color conversion device that will be described may be used, for example, by being installed in an image output device such a digital copier or a printer, by being installed in a server connected to an image output device, or by being installed in a computer (driving device) that provides instructions to an image output device.

As shown in FIG. 1, color conversion device 10 is configured to include a color converter 12, an output color space converter 14, a color conversion mode setting unit 16, and a memory 18.

The color converter 12 is configured to include a first color conversion processor 12-1 up to an $N^{th}$ color conversion processor 12-N (where N is a positive integer).

The color converter 12 carries out color conversion on a color image signal that has been input thereto, converting the signal into a color signal that is within an output gamut (the color region that an output device is able to reproduce), and outputs this converted signal to the output color space converter 14.

In the exemplary embodiment, a predetermined color space, such as CIELab color space, is set as a device independent color space.

The color converter 12 divides the device independent color space into N color regions corresponding to the importance of respective colors, and, depending on the color region that a color included in an input color image signal falls, carries out color conversion on the color image signal that corresponds to that particular color region. In FIG. 1, an example is shown in which the first to the $N^{th}$ color conversion processors 12-1 to 12-N are provided, corresponding to the respective color regions.

The first color conversion processor 12-1 carries out a color conversion for converting colors that fall within the first color region including the most important colors to colors within the output gamut. The second color conversion processor 12-2 carries out a color conversion for converting colors that fall within the second color region including the second most important color to colors within the output gamut. In the same manner, the $N^{th}$ color converter 12-N carries out color conversion for converting colors that include the least important color (colors that have not been included in any of the first to the $N-1^{th}$ color regions) to colors within the output gamut.

It should be noted that when it is known in advance that the colors in the input color image signal are limited to those of the first to the $i^{th}$ color regions (where i is a positive integer), it may be configured such that processing is not carried out in the $i+1^{th}$ to the $N^{th}$ color conversion processors 12-i+1 to 12-N, or such that the $i+1^{th}$ to the $N^{th}$ color conversion processors 12-i+1 to 12-N are not provided, and the color image signal is input into the $i^{th}$ color conversion processor. Alternatively, it may be configured such that for each of the colors of the pixels in the input color image signal, the color region that the color of that pixel falls in is determined, and then input is made to any one of the color conversion processor 12-1 to 12-N that corresponds with that color region.

Further, each of the color conversion processors need not carry out conversion to the output gamut in a single step at one time for the color regions that they correspond to, and, for example, conversion from a less important color region to a more important region may be performed at first, and after this, processing may be requested at the color conversion processors corresponding to the converted (relatively more important) color regions. The arrow headed lines between the color conversion processors in FIG. 1 indicate the color signal flow in such a case of sequentially requesting processing at the color conversion units that carry out processing for relatively more important colors.

For example, when N=3, the color image signal in the third color region is converted by the third color conversion processor 12-3 to fall within the second color region and is output to the second color conversion processor 12-2. The second color conversion processor 12-2 converts the input color image signal into a color image signal that falls within the first color region and outputs this signal to the first color conversion processor 12-1. The first color conversion processor 12-1 then converts the color image signal into a color image signal that falls within the output gamut. More appropriate color conversion may be performed by carrying out such color conversion by stages than by carrying out the conversion to the output gamut in a single step.

The output color space converter 14 receives the color signal that has been performed color conversion process by the color converter 12 and that is made up from colors that fall within the output gamut, carries out color space conversion from device independent color space to color space dependent on the output device, and outputs this signal as an output color image signal.

The memory 18 stores, for example, an input profile that represents the color reproduction characteristics of the input (source) device, i.e., an input profile that represents the characteristics of the source (input end) color region in relation to the input color image signal, and various information that has been input to the color conversion device 10.

Figure 2:
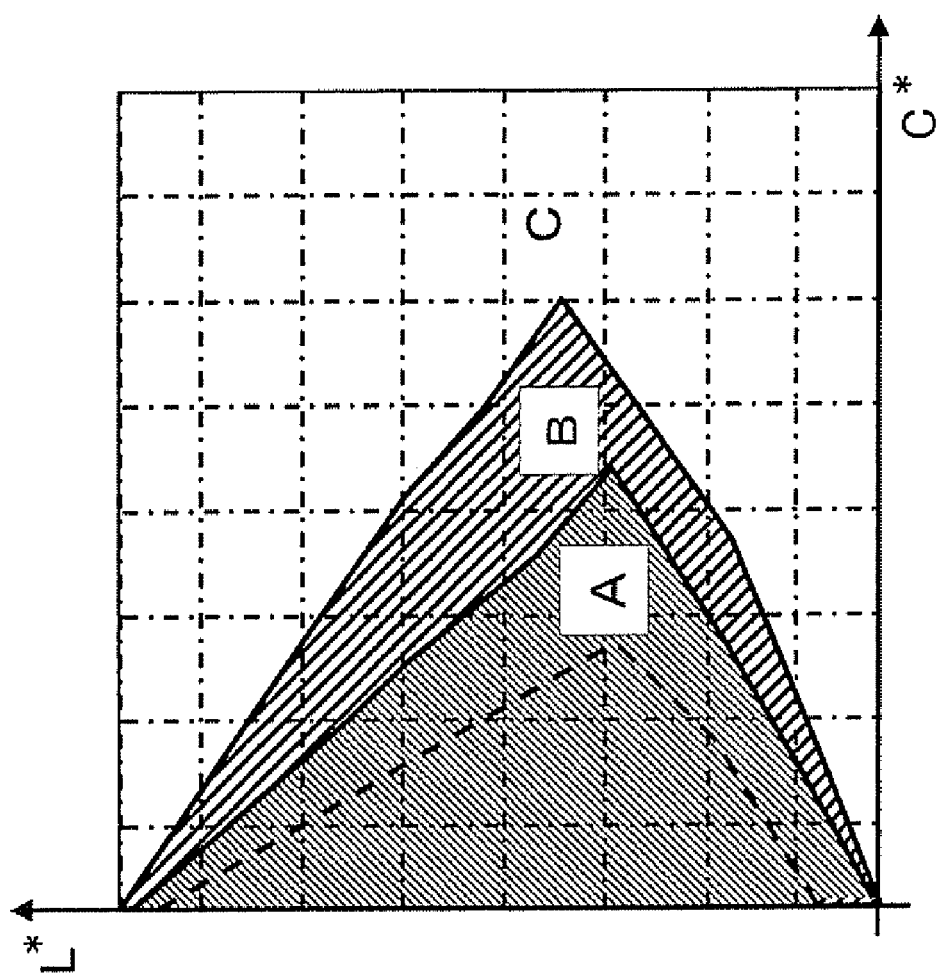
FIG. 2 is a diagram of an example of a divided color region.

FIG. 2 is an explanatory diagram of an example of plural color regions set by the color converter 12. In FIG. 2, it is assumed that the device independent color space is CIELab color space, and a hue plane is shown that includes the L* axis. The output gamut is shown by an intermittent line. Region A represents a region including the most important colors for color reproduction. Colors that fall within this color region are color conversion processed so as to have optimal color reproduction. This region A may be, for example, a color region of a general CRT that is used for generating color image signals, or it may be a color region of a generally used scanner. Furthermore, when the color conversion device 10 is incorporated in a particular device or system, then the region A may be the color region of a CRT, or the color region of a scanner or the like that are often used in that device or system. The colors included in the region A are colors that are frequently used, or generally used, and therefore there is great importance given to their reproducibility. Therefore, the colors within this region A are color conversion processed such that they will be optimally reproduced by the output device.

Region B is a region that contains the next most important colors after those of region A, and this may be, for example, a color region that encompasses the colors that are reproduced on the main devices, which are not included in the colors of the region A. In other words, such a region B is a region that is disposed between the boundary of the region A containing the colors that are important for color reproduction and the boundary of the color region encompassing the colors that are reproduced on the main device. Such a region B is a color region that are not always used, but rather is a color region that are used by a device, such as a CRT or scanner, for example, when the input color image signal is generated. Since these are colors that are not always used, the level of importance is lower than that of the colors within the region A. However, these are nevertheless colors within the range of expected devices used by a user, and therefore the region is one in which a reasonable level of good color reproduction is desired. Therefore, good color reproduction color conversion is carried out for this region at a level that does not influence the color reproduction of the region A.

Region C is a region that is other than the region A and the region B, and, for example, is the color region outside of the boundary of the color region encompassing the colors that are reproduced on the main devices. This color region is a region of colors that are hardly ever reproducible using normal devices, and of colors that are rarely used in practice. Therefore, these are colors with a low level of importance. However, these colors may be input if, for example, a user specifies with numerical values, or if image data has been Generated based on numerical values by software. Since a reasonable color should be reproduced when such colors are input, color conversion may be carried out for that purpose.

Here, the device independent color space has been divided into the regions A to C according to the importance of the colors; however, there is no limitation to this being three regions, and, for example, two regions or four or more regions may be used. The region A may, for example, be divided further into colors within and outside of the output gamut, and color conversion may be carried out regarding the colors of the output gamut as the most important colors, and regarding the other colors in region A as the important colors. The region B or C may further divided in the same manner as the region A.

The exemplary embodiment will be explained for a case of the above described three divisions. Therefore, the color converter 12 is configured to include a first color conversion processor 12-1, a second color conversion processor 12-2, and a third color conversion processor 12-3.

Modes that may be used for color conversion by each of the color conversion processors include, for example, a color conversion mode in which a color conversion function is used for converting the input color image signal into an image signal that is within a predetermined color region, or a color conversion mode that uses a color conversion coefficient such as a look up table (referred to below as DLUT) for converting the input color image signal into an image signal that is within a predetermined color region in the exemplary embodiment, a case in which each of the color conversion processors perform color conversion using the DLUT will be explained.

During normal color conversion, the image signal that is input to the color converter 12 is suitably color conversion processed by at least one of the first color conversion processor 12-1 to the third color conversion processor 12-3, corresponding to which of the color regions the colors fall within, and this converted color signal is output to the output color space converter 14.

Further, in the exemplary embodiment, the color region of at least one of the region A or the region B is modified according to the characteristics of the source color region related to the input image signal. That is, modification is made to the conversion mode for converting an image signal to fall within the region A and/or to the conversion mode for converting an image signal to fall within the region B. Modification of the color conversion mode is performed by the color conversion mode setting unit 16.

Explanation will now be given of the processing that is executed by the color conversion mode setting unit 16, with reference to the flow chart shown in FIG. 3.

Figure 3:
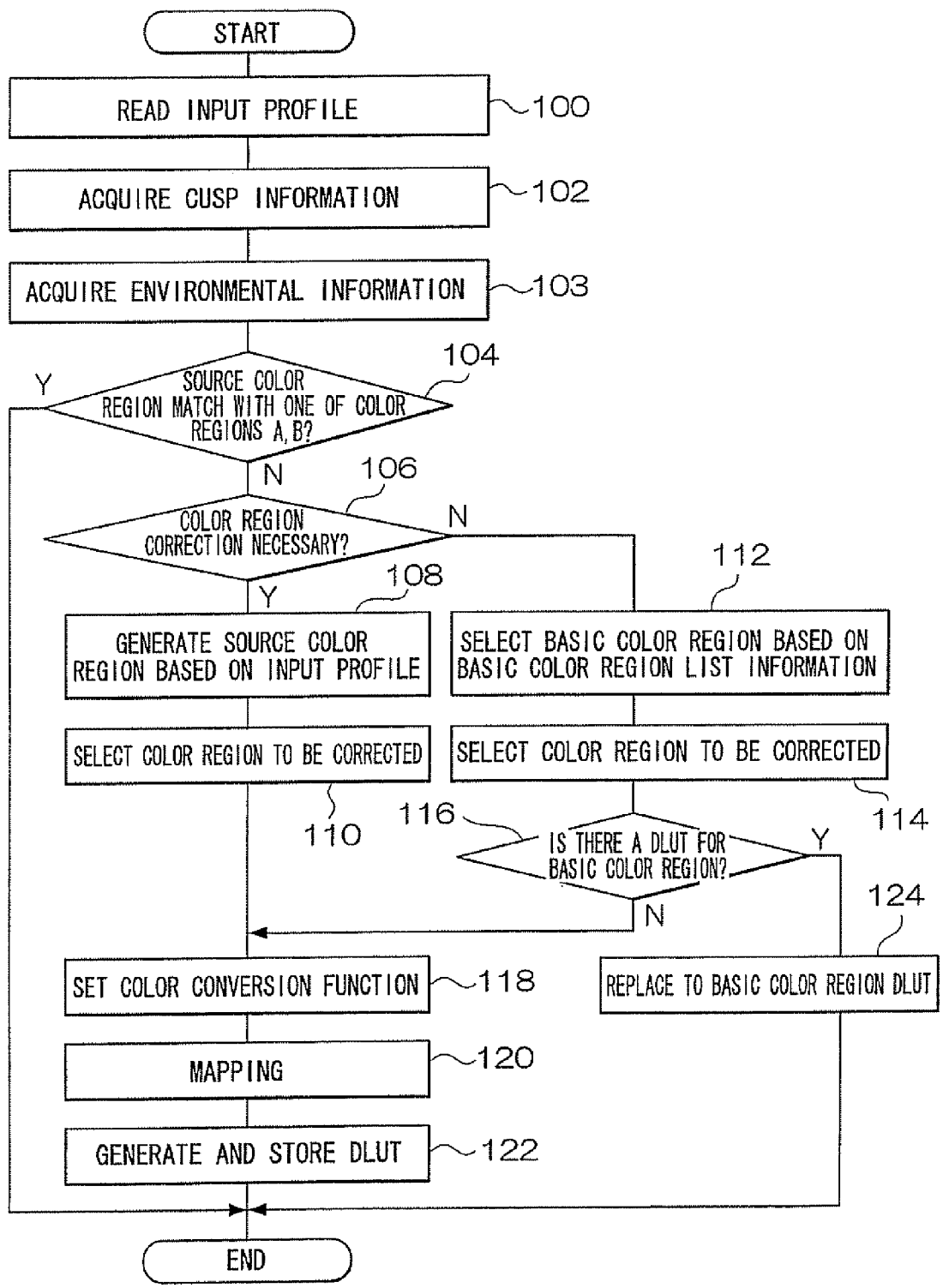
FIG. 3 is a flow chart of processing executed in a color conversion mode setting unit.

The program performing the process shown in FIG. 3 is stored in advance in the color conversion mode setting unit 16. Furthermore, information about the input profile and environment of the input color image signal, information relating to the maximum saturation point(s) (CUSPs) of the principal colors (Y, M, C, R, G, B and the like) of the currently set color regions A and B, and the like is also stored in the memory 18.

First, in step 100, the input profile that is stored in the memory 18 is read out by the color conversion mode setting unit 16. In step 102, information, such as the maximum saturation point(s) (CUSPs) of the principal colors (Y, M, C, R, G, B and the like) of the source color region in CIELab color space is acquired based on the read input profile.

In step 103, information relating to the environment of the input color image signal is acquired if this is stored in the memory 18. It should be noted that environmental information is information relating to the environment in which the input image signal has been obtained, and includes, for example, background luminance, adaptation luminance, incomplete chromatic adaptation factors, and the like.

It is determined in step 104 whether or not any one of the currently set color regions A, B substantially matches the source color region, and where a match is found this routine ends. Where a substantial match is not found then the routine proceeds to step 106. This determination is made by, for example, comparing the maximum saturation point(s) of the principal colors of the color regions A, B that is stored in the memory 18 with the maximum saturation point(s) of the principal color of the source color region, and determining whether or not these substantially match. The meaning of substantially matched is either that there is a complete match, or, for example, that although there is no complete match, there is a near match such that hardly any differences are generated at the level of precision of color conversion.

It is determined in step 106 whether or not any corrections are required to the color regions A, B, in other words it is determined whether or not it is necessary to modify the conversion mode for converting the image signal to fall within the color regions A, B. In order to make such a determination, a basic color region list information is stored in advance in the memory 18, such as, for example, the maximum saturation point(s) of principal colors of plural types of basic color regions (such as, for example, RGB) that have been determined in advance, basic color region data for expressing basic color regions, and environment information which indicates the existence or not of environmental conditions, in other words, indicates whether the basic color region data has considered the environmental conditions or not. Determination is then made as to whether or not any basic color region that matches with the maximum saturation point(s) and the existence or not of environmental conditions of the source color region exists in the basic color region list information. In such a case, when there is a basic color region that matches with the maximum saturation point(s) of the principal color and the existence or not of environmental conditions of the source color region in the basic color region list information, determination is made that there is no necessity to correct any one of the color regions A, B, and the routine proceeds to step 112. Otherwise, determination is made that it is necessary to correct one of the color regions A, B and the routine proceeds to step 108.

In step 108 the source color region is generated based on the input profile. There are, for example, the three methods below which may be used for the source color region generation.

In a first method, a basic color region that has maximum saturation point(s) that are close to the maximum saturation point(s) of the source color region is selected from the basic color region list information, and the source color region is corrected according to the maximum saturation point(s) data of this basic color region. For example, if the source color region data expressing the source color region is denoted InGamutdata, the basic color region data is denoted ListGamutdata, the saturation of the maximum saturation point(s) of the source color region is denoted Cin, and the saturation of the maximum saturation point(s) of the basic color region that has been selected is Clist, then the source color region may be corrected by computing InGamutdata according to the following formula.

$$InGamutdata = ListGamutdata \times (Cin/Clist) \quad (1)$$

In a second method, if a color conversion matrix is included in the color profile, the source color region may be generated by converting the image signal in the input (source) device dependent color space according to an image signal of CIELab color space based on that color conversion matrix.

In a third method, if there is data that expresses the source color region, called gamut tags, included in the input profile, then these may be used.

In step 110, the color region that needs to be corrected is selected from the color regions A, B. For example, the color region that needs to be corrected may be selected by determining in advance the correspondence relationship between the type of input image signal and the color region that needs to be corrected, and selecting the color region according to this correspondence relationship. It should be noted that either one of the color regions A, B may be selected as the color region that needs to be corrected, or the both may be selected as the color regions that need to be corrected.

In step 106, if it has been determined that there is no necessity to correct at least one of the color regions A, B, then the basic color region that matches the source color region is selected from the basic color region list data, and the color region that needs to be corrected is selected at step 114. The process at step 114 is the same as that at step 110.

In step 116, determination is made as to whether or not a DLUT for the basic color region color conversion coefficient is stored in the memory 18. When the DLUT is stored, the routine proceeds to step 124, and when the DLUT is not stored the routine proceeds to step 118.

In step 124, in order to set the DLUT of the basic color region that has been stored in memory 18 as the color conversion mode that is to be used for the color region that needs to be corrected which is selected in step 114, the DLUT is output to the color conversion processor that corresponds to the color region to be corrected.

In step 118, a color conversion function is set according to information on the characteristics relating to the environmental information that has been acquired in step 103, the maximum saturation points, gamma characteristics, and chromaticity points. Explanation will now be given of one example of a mapping method using a color conversion function. First, for example, a method described in JP-A No. 2005-191808, which is incorporated in the disclosure of the present specification by reference, may be applied as a mapping method for controlling the compression ratio and the number of gradations in the hue direction, and number of gradations in the brightness direction. A compression coefficient Cn11 in this compression method is included as a parameter in a non-linear function for converting the input color signal into an output color signal, and is a parameter for specifying a compression ratio on a conversion vector. From this, the compression coefficient Cn11 is specified according to the distance on the conversion vector between the target point (achromatic point) and the point indicating the input color signal. In addition, in non-linear compression/decompression processing, the compression coefficient is determined using, as the source color reproduction region, the corrected color region that is generated in step 180 and 110 and the maximum saturation point(s). If the color region and the maximum saturation point(s) are greater than those of the color region before correction is made, then the compression coefficient is changed to a high value to avoid a reduction in saturation.

In the non-linear compression/decompression processing used in such a method, the distance LUout on the conversion vector from the achromatic point to the output image signal may be derived using the following non-linear functions of formulae (2) and (3), based on the distances from the achromatic point on the conversion vector to the boundary points of the source color reproduction region and to the boundary points of the output color reproduction region, which are denoted Lin and Lout, respectively, the distance from the achromatic point to the input image signal, which is denoted L'in, and the compression coefficient Cn11 that is set according to the color reproduction purpose and object for color conversion.

$$L'out = L'in \times (Lout/Lin)^{f(x)} \quad (2)$$

$$f(x) = (L'in/Lin)^{Cn11} \quad (3)$$

The compression ratio and the number of gradations may be varied by changing the compression coefficient Cn11.

A method such as, for example, one described in JP-A No. 2005-184601, which is incorporated in the disclosure of the present specification by reference, may be applied as a mapping method, for controlling an amount of hue conversion. In such a mapping method, hue conversion is carried out with a predetermined hue conversion function. Such a hue conversion function performs hue conversion such that the degree of hue conversion changes with the saturation in the input color signal, with large changes to hue in high saturation regions, in contrast to hardly any changes in the hue in low saturation regions. Furthermore, such a hue conversion function includes a parameter of a compression coefficient that is set for weighting the degree of hue conversion in the saturation direction. Specifically, an exponential function such as the following formula, for example, may be used.

$$Cout = Cin - Cdif \times (Cdata/Cmax)^{Cn12} \quad (4)$$

In formula (4), Cout is an output image signal hue angle, Cin is an input image signal hue angle, Cdif is a maximum saturation hue movement amount, Cdata is a saturation of the input image signal, Cmax is a saturation of the maximum saturation point(s). Cn12 is a compression coefficient for weighting, and C12 is a non-linear coefficient for adjusting the nonlinearity. The hue movement amount may be changed by changing the compression coefficient Cn12.

A method such as, for example, one described in JP-A No. 2005-184602, which is incorporated in the disclosure of the present specification by reference, may be applied as a mapping method for controlling an amount of brightness conversion. In such a mapping method, brightness conversion is carried out according to a predetermined brightness conversion function. Such a brightness conversion function varies the degree of brightness conversion according to the saturation of the input image signal, such that there are large changes in brightness for high saturation regions, and in contrast there are hardly any changes in brightness for low saturation regions. Furthermore, such a brightness coefficient includes a parameter of a compression coefficient that is set for weighting the degree of brightness conversion in the saturation direction. Specifically, an exponential function like that of the following formula, for example, may be used.

$$Lout = Lin - Ldif \times (Cin/Cmax)^{Cn13} \quad (5)$$

In formula (5), Lout indicates a brightness value after conversion, Ldif indicates a brightness adjustment value, Cin denotes the saturation in the input image signal, and Cmax denotes the saturation of the maximum saturation point(s) of the source color reproduction region. Furthermore, Cn13 is a compression coefficient for weighting and Cn13 is a non-linear coefficient for adjusting the nonlinearity. The brightness conversion amount may be changed by chancing such a compression coefficient Cn13. In addition, the brightness conversion function may be changed according to the gamma characteristics of the input image signal. The non-linear coefficient is changed in a manner such that the brighter the gamma characteristic, the smaller the brightness conversion amount.

In step 118, the color conversion function may be set such that, for example, a hue conversion amount and the non-linearity of the hue conversion function differ according to whether or not there is environmental information and according to the chromaticity point. In such a case, the color conversion function, specifically the compression coefficient Cn12 as described above, may be set using, for example, a color conversion function described in JP-A No. 2005-184601, which is incorporated in the disclosure of the present specification by reference, such that when there is no environmental information, there is greater degree of non-linearity than in cases where there is environmental information. Further, the hue conversion amount and the hue conversion function may be changed to match the hue information for the chromaticity points of the input image signal.

In step 120, the image signal of lattice points that are required for generating the DLUT, from each of the lattice points when CIELab color space, for example, is divided into a lattice shape, are converted using the color conversion function that is set in step 118.

In step 122, the DLUT is generated, based on the conversion result of step 120, and the DLUT is stored in the memory 18, and is also output to the color conversion processor that corresponds to the generated DLUT. Thereby, the color conversion in that particular color conversion processor is carried out with the newly generated DLUT.

Thus, in the exemplary embodiment, a color conversion function is set so as to correct at least one of the color regions A, B according to the characteristics of the source color region. Therefore, the input image signal may be converted to an image signal that falls within a predetermined color region.

It should be noted that in the exemplary embodiment, the color region to be corrected is selected based on the maximum saturation point(s) of the principal colors as the characteristic of the source color region, and the color conversion function is set thereto. However, the present invention is not limited thereto, and the color region to be corrected may be selected based on information, such as gamma characteristics, chromaticity or the like, of the source color region, and the color conversion function is set thereto.

The foregoing description of the exemplary embodiment of the present invention has been provided for the purpose of illustration and description. It is not intended to be exhaustive or to limit the invention to the precise form disclosed herein. Obviously, many modifications and variations will be apparent to a practitioner skilled in the art. The exemplary embodiments were chosen and described in order to best explain the principles of the invention and its practical applications, thereby enabling others skilled in the art to understand the invention according to various embodiments and with various modifications as are suited to the particular use contemplated. It is intended that the scope of the invention be defined by the following claims and their equivalents,

What is claimed is:

1. A color conversion device comprising:
a setting unit that sets a conversion mode, based on characteristics of a source color region related to an input image signal in a color space, for converting the input image signal to an image signal that falls within at least one color region from a plurality of color regions that have been defined in the color space; and
a conversion unit that converts the input image signal in accordance with the conversion mode into the image signal that falls within the color region, wherein,
when there are no characteristics related to environmental conditions of the source color region included in the characteristics of the source color region, the setting unit sets the conversion mode such that there is a higher degree of non-linearity for hue conversion than when characteristics related to the environmental conditions of the source color region are included in the characteristics of the source color region.

2. The color conversion device according to claim 1, wherein the setting unit comprises a selection unit that selects a color region that needs to be corrected from among the plurality of color regions, based on a maximum saturation point of the source color region, and the setting unit sets the conversion mode for converting the input image signal to fall within the color region that has been selected.

3. The color conversion device according to claim 1, wherein the characteristics of the source color region comprise at least one characteristic selected from:
characteristics related to a predetermined maximum saturation point of the source color region;
characteristics related to environmental conditions of the source color region;
gamma characteristics of the source color region: and
characteristics related to chromaticity points of the source color region.

4. The color conversion device according to claim 1, wherein the setting unit sets the conversion mode such that a hue region in the color region is corrected.

5. The color conversion device according to claim 1, wherein the setting unit sets the conversion mode such that the conversion amount progressively decreases toward the low saturation side in the color region.

6. The color conversion device according to claim 1, wherein the conversion mode is a color conversion function for converting the input image signal into an image signal that falls within the color region.

7. The color conversion device according to claim 1, wherein the conversion mode is a color conversion coefficient for converting the input image signal into an image signal that falls within the color region.

8. A color conversion device comprising:
a setting unit that sets a conversion mode, based on characteristics of a source color region related to an input image signal in a color space, for converting the input image signal to an image signal that falls within at least one color region from a plurality of color regions that have been defined in the color space;
a conversion unit that converts the input image signal in accordance with the conversion mode into the image signal that falls within the color region; and
a memory unit that stores characteristics of a plurality of types of color regions and conversion modes corresponding to characteristics of each of the color regions, wherein
when there is a color region in the plurality of types of color regions with characteristics that substantially match those of the source color region, the setting unit sets the conversion mode corresponding to the characteristics of the substantially matching region.

9. A color conversion method comprising:
setting a conversion mode based on characteristics of a source color region related to an input image signal in a color space, the conversion mode being for converting the input image signal to an image signal that falls within at least one color region from a plurality of color regions that have been defined in the color space; and
converting the input image signal in accordance with the conversion mode into the image signal that falls within the color region, wherein
when there are no characteristics related to environmental conditions of the source color region included in the characteristics of the source color region, the conversion mode is set such that there is a higher degree of non-linearity for hue conversion than when characteristics related to the environmental conditions of the source color region are included in the characteristics of the source color region.

10. A non-transitory storage medium on which a program for executing color conversion on a computer is stored, the color conversion comprising:
setting a conversion mode based on characteristics of a source color region related to an input image signal in a color space, the conversion mode being for converting the input image signal to an image signal that falls within at least one color region from a plurality of color regions that have been defined in the color space; and
converting the input image signal in accordance with the conversion mode into the image signal that falls within the color region, wherein when there are no characteristics related to environmental conditions of the source color region included in the characteristics of the source color region, the conversion mode is set such that there is a higher degree of non-linearity for hue conversion than when characteristics related to the environmental conditions of the source color region are included in the characteristics of the source color region.

11. A color conversion coefficient generation device comprising:
a setting unit that sets a conversion mode, based on characteristics of a source color region related to an input image signal in a color space, for converting the input image signal to an image signal that falls within at least one color region from a plurality of color regions that have been defined in the color space;
a conversion unit that converts the input image signal in accordance with the conversion mode into the image signal that falls within the color region; and
a generation unit that generates a color conversion coefficient, based on the conversion result of the conversion unit, for converting the input image signal into the image signal that falls within the color region, wherein when there are no characteristics related to environmental conditions of the source color region included in the characteristics of the source color region, the setting unit sets the conversion mode such that there is a higher degree of non-linearity for hue conversion than when characteristics related to the environmental conditions of the source color region are included in the characteristics of the source color region.

12. A color conversion coefficient generation method comprising:

setting a conversion mode, based on characteristics of a source color region related to an input image signal in a color space, for converting the input image signal to an image signal that falls within at least one color region from a plurality of color regions that have been defined in the color space;

converting the input image signal in accordance with the conversion mode into the image signal that falls within the color region; and generating a color conversion coefficient, based on the conversion result, for converting the input image signal into the image signal that falls within the color region, wherein when there are no characteristics related to environmental conditions of the source color region included in the characteristics of the source color region, the conversion mode is set such that there is a higher degree of non-linearity for hue conversion than when characteristics related to the environmental conditions of the source color region are included in the characteristics of the source color region.

13. A non-transitory storage medium on which a program for executing color conversion coefficient generation on a computer is stored, the color conversion coefficient generation comprising:

setting a conversion mode, based on characteristics of a source color region related to an input image signal in a color space, for converting the input image signal to an image signal that falls within at least one color region from a plurality of color regions that have been defined in the color space;

converting the input image signal in accordance with the conversion mode into the image signal that falls within the color region; and generating a color conversion coefficient, based on the conversion result, for converting the input image signal into the image signal that falls within the color region, wherein when there are no characteristics related to environmental conditions of the source color region included in the characteristics of the source color region, the conversion mode is set such that there is a higher degree of non-linearity for hue conversion than when characteristics related to the environmental conditions of the source color region are included in the characteristics of the source color region.

* * * * *